United States Patent
Tu et al.

(10) Patent No.: US 8,826,009 B2
(45) Date of Patent: Sep. 2, 2014

(54) METHOD OF HANDLING A CERTIFICATION REQUEST

(71) Applicant: Research In Motion Limited, Waterloo (CA)

(72) Inventors: Van Quy Tu, Kitchener (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/627,041

(22) Filed: Sep. 26, 2012

(65) Prior Publication Data

US 2013/0031362 A1    Jan. 31, 2013

Related U.S. Application Data

(63) Continuation of application No. 12/256,082, filed on Oct. 22, 2008.

(51) Int. Cl.
| | |
|---|---|
| *H04L 29/06* | (2006.01) |
| *H04L 9/00* | (2006.01) |
| *H04L 9/30* | (2006.01) |
| *H04L 9/32* | (2006.01) |
| *G06F 15/16* | (2006.01) |
| *G06F 17/30* | (2006.01) |

(52) U.S. Cl.
USPC ........... 713/156; 713/169; 713/170; 713/176; 726/5

(58) Field of Classification Search
None
See application file for complete search history.

(56) References Cited

U.S. PATENT DOCUMENTS

| | | | |
|---|---|---|---|
| 6,253,322 B1* | 6/2001 | Susaki et al. ................... | 713/170 |
| 8,135,950 B2* | 3/2012 | Parkinson ..................... | 713/156 |
| 8,296,563 B2 | 10/2012 | Tu et al. | |
| 2003/0115475 A1 | 6/2003 | Russo et al. | |
| 2004/0196978 A1 | 10/2004 | Godfrey et al. | |
| 2005/0076199 A1 | 4/2005 | Thornton et al. | |
| 2005/0076205 A1 | 4/2005 | Thornton et al. | |
| 2005/0078830 A1 | 4/2005 | Thornton et al. | |
| 2005/0081025 A1 | 4/2005 | Thornton et al. | |
| 2005/0081026 A1 | 4/2005 | Thornton et al. | |
| 2005/0149442 A1 | 7/2005 | Adams et al. | |
| 2005/0257045 A1 | 11/2005 | Bushman et al. | |

(Continued)

FOREIGN PATENT DOCUMENTS

EP    1881665 A    1/2008

OTHER PUBLICATIONS

RSA Laboratories, PKCS #10 v1.7: Certification Request Syntax Standard, May 26, 2000.
Blackberry, Blackberry Mobile Data System, Sep. 9, 2008.

(Continued)

*Primary Examiner* — Shin-Hon Chen
(74) *Attorney, Agent, or Firm* — Ridout & Maybee LLP

(57) ABSTRACT

In a certification request, a user device includes an object identifier. When a certification authority generates an identity certificate responsive to receiving the certification request, the certification authority includes the object identifier, thereby allowing improved management of the identity certificate at the user device and elsewhere.

13 Claims, 6 Drawing Sheets

(56) References Cited

U.S. PATENT DOCUMENTS

| | | | |
|---|---|---|---|
| 2007/0073621 A1 | 3/2007 | Dulin et al. | |
| 2007/0094493 A1 | 4/2007 | Ali et al. | |
| 2007/0288746 A1 | 12/2007 | Jones | |
| 2008/0172338 A1* | 7/2008 | Malcolm | 705/64 |
| 2008/0209208 A1 | 8/2008 | Parkinson | |
| 2009/0046852 A1* | 2/2009 | Vanstone | 380/30 |
| 2009/0138947 A1* | 5/2009 | Schneider et al. | 726/5 |
| 2009/0169019 A1* | 7/2009 | Bauchot et al. | 380/278 |
| 2009/0287933 A1* | 11/2009 | Beckwith et al. | 713/176 |
| 2010/0058058 A1* | 3/2010 | Busari | 713/169 |

OTHER PUBLICATIONS

ETS1, Digital Cellular Telecommunications System (Phase 2+); Universal Mobile Telecommunications Systems (UMTS), Generic Authentication Architecture (GAA); Support for Subscriber Certificates (3GPP TS 33,221 version 7.1.0 Release 7), ETSI Standards, LIS, Sophia Antipolis, Cedex, France, vol. 3-SA3, No. V7.1.0, Jan. 1, 2008.

European Search Report, Application No. 08167341,0-1244 Apr. 20, 2009.

* cited by examiner

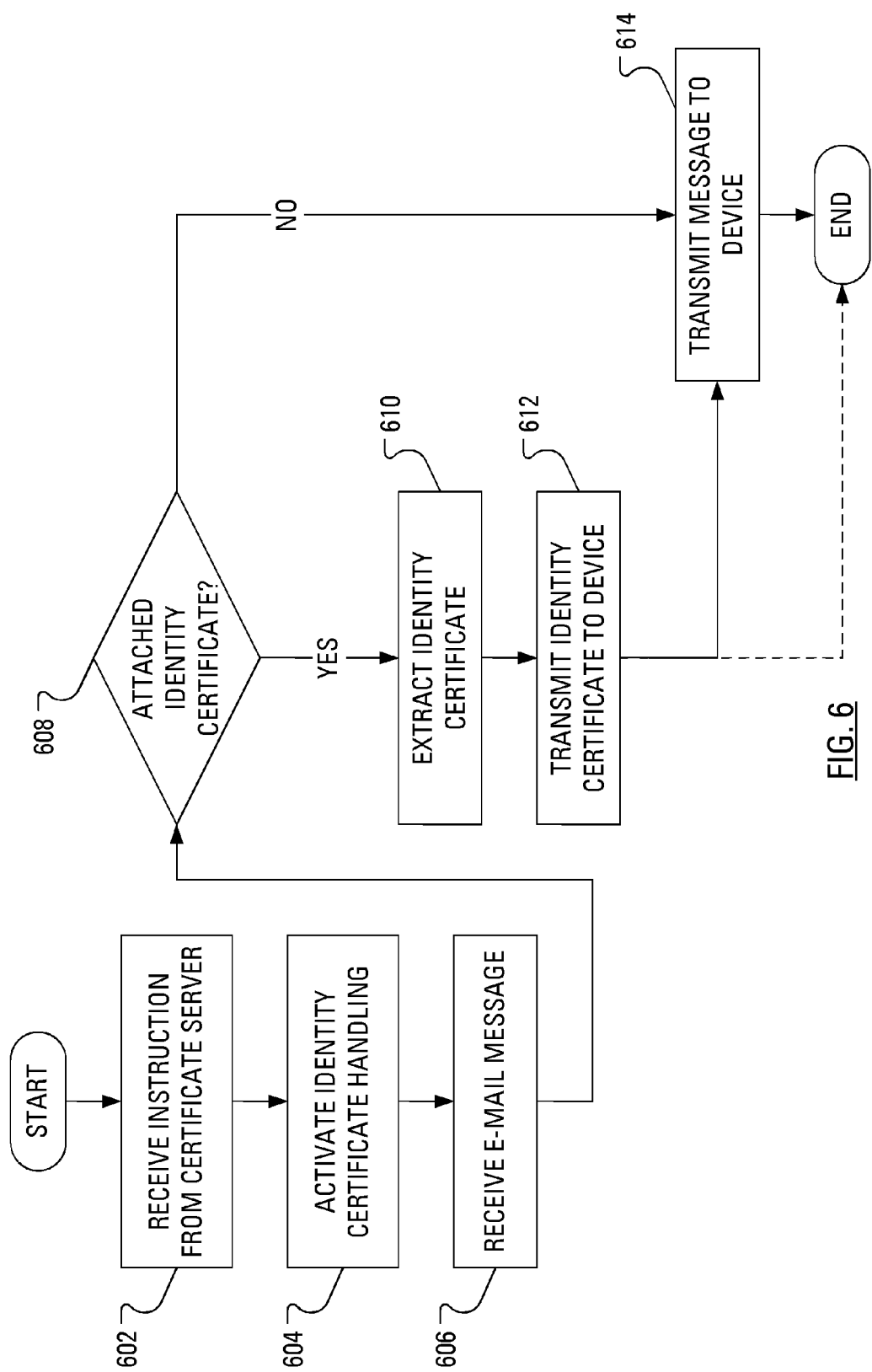

METHOD OF HANDLING A CERTIFICATION REQUEST

CROSS-REFERENCE TO RELATED APPLICATIONS

The present application is a continuation of U.S. patent application Ser. No. 12/256,082, filed Oct. 22, 2008, the contents of which are hereby incorporated herein by reference.

FIELD OF THE INVENTION

The present application relates generally to identity certificates used to authenticate public cryptographic keys and, more specifically, to a method of handling a certification request for a public cryptographic key.

BACKGROUND OF THE INVENTION

User devices, including, but not restricted to, wireless mobile communication devices, personal computers, laptop or portable computers, smartphones, personal digital assistants (PDAs), and the like, may generate cryptographic keys for use in a public key infrastructure (PKI) scheme. In a PKI scheme, a device generates a public key and a corresponding private key. However, such keys are of little use unless the public key is reliably associated with the identity of the user device, or of the user of the user device.

A public key certificate (or identity certificate) is an electronic document, issued by a trusted party. The public key certificate incorporates a digital signature to bind together a public key with an identity—information such as the name of a person or an organization, an associated address and so forth. The certificate can be used to verify that a public key belongs to an individual.

An identity certificate typically contains: a public key; an owner's name; an expiration date of the public key; the name of the issuer; an identity of the Certificate Authority that issued the digital certificate; a serial number for the digital certificate; and a digital signature of the issuer.

BRIEF DESCRIPTION OF THE DRAWINGS

Reference will now be made to the drawings, which show by way of example, embodiments of the invention, and in which:

FIG. 6 illustrates example steps in a method of handling, at the certificate server of FIG. 1, responses from the certificate authority of FIG. 1 according to an embodiment.

DETAILED DESCRIPTION OF THE EMBODIMENTS

Figure 1:
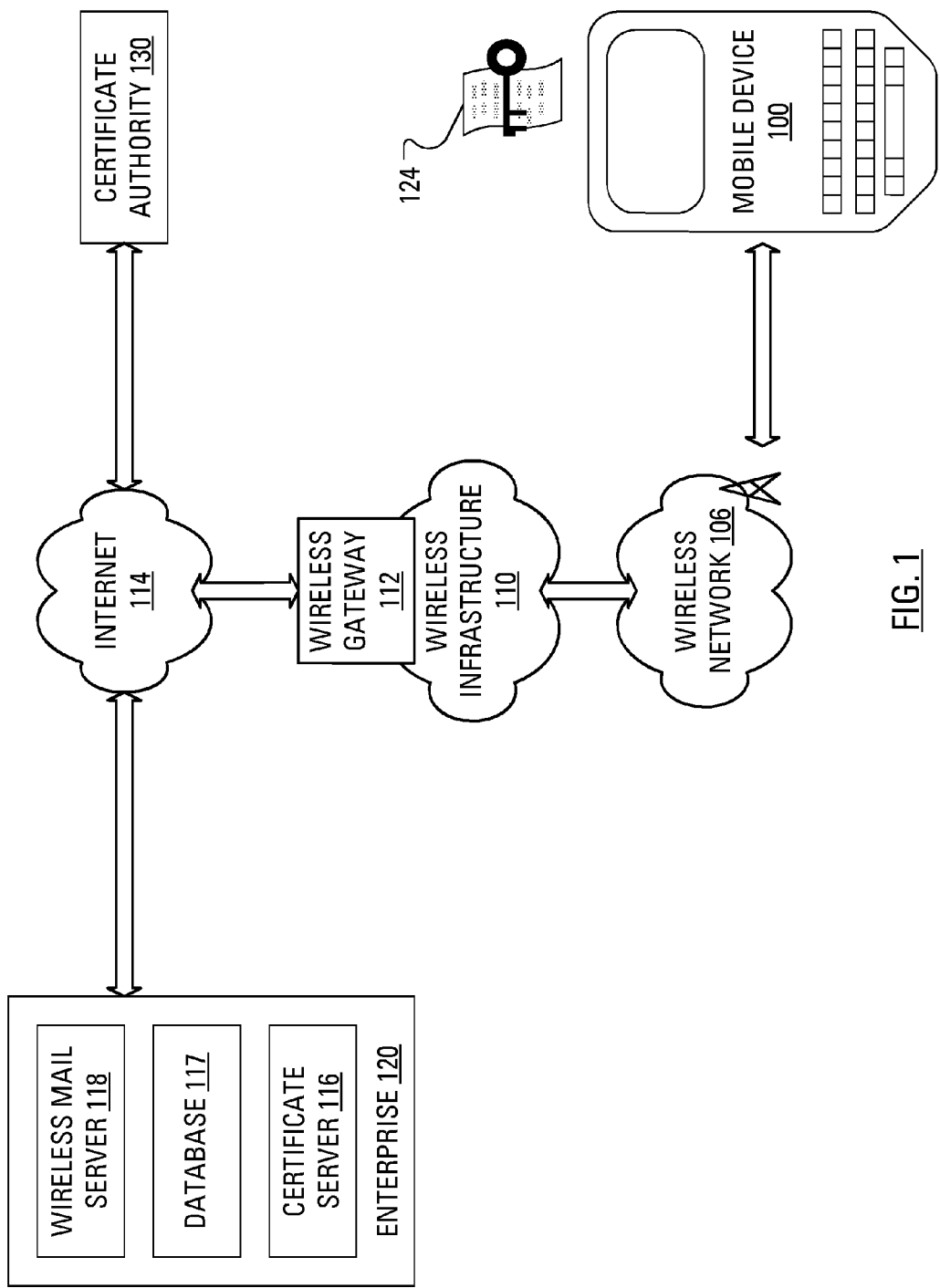
FIG. 1 illustrates an example system, including a user device and a access device, in which aspects of the present application find use.

In public key infrastructure systems, a certificate signing request (also "CSR" or certification request) is a message sent from an applicant to a Certificate Authority (CA) to apply for an identity certificate for a public key that has been previously generated, with associated private key. The certification request contains information identifying the applicant and the public key chosen by the applicant. The corresponding private key is not included in the certification request, but is used to digitally sign the entire certification request.

If the certification request is successful, the CA will send back an identity certificate that has been digitally signed with the private key of the certificate authority.

Sometimes the CA is an enterprise CA, other times the CA is a standalone CA, hosted offsite. An administrator of the CA does not always have control with respect to how requested certificates are approved. In some situations, the CA issues the certificate right away in response to the certification request. In other situations, the CA does not issue the certificate right away in response to the certification request. Instead, the CA transmits the certificate to the user device at a later time, for example, as an attachment to an e-mail message.

When the e-mail message with the attached certificate is received at the user device, it is left to the user to determine, first of all, that the received e-mail message has a certificate attached and that the attached certificate is the certificate that was requested in the certification request sent to the certificate server. Where the user device is a wireless communication device, it may be that the attachment is not sent to the user device with the e-mail message. Instead, a wireless mail server through which the user device receives e-mail messages, retains attachments associated with e-mail messages forwarded to wireless communication devices, thereby avoiding an undue burden on the wireless channels. Accordingly, it is left for the user to specifically request to download the certificate from the wireless mail server and arrange importation of the certificate into a "key store" on the user device. Such certificate management may be considered to be awkward for all but the most technical savvy of users.

To reduce the burden on the user, it has been proposed to have the user device automatically scan all incoming messages in an attempt to recognize a message from a CA that, as sent, had an attached certificate. It would then be expected that, responsive to recognizing such a message, the user device would automatically request to download the certificate from the wireless mail server and import the downloaded certificate into the key store. One difficulty with this proposal is the difficulty of recognizing certificate-providing messages when the certificate is not attached, since distinct Certificate Authorities are likely to format the body of a certificate-providing message in a different way. Additionally, since the certificate is an attachment, it may not be evident whether the e-mail message with the certificate attachment is arriving responsive to the most recent certification request or whether the certificate is arriving for an earlier certification request or other reason.

Removing the necessity for on-device user management of certificates may be beneficial. To that end, it is proposed herein to have the wireless mail server automatically scan incoming messages in an attempt to recognize a message from a CA that has an attached certificate. Upon recognizing such a message, the wireless mail server may extract the certificate from the message and transmit the certificate to the user device over a configuration channel, thereby eliminating the necessity for the user to manage certificates. However, when there is a delay between the device-based transmission of a certification request and the mail-server-based delivery of the certificate to the user device, the certificate may lack context upon arrival at the user device.

To add context, an object and a corresponding object identifier (OID) may be included in a certification request. For example, the certification request may include a public key and a OID corresponding to the public key. The CA should include the OID-value pair within the identity certificate that is generated and attached to an e-mail message sent to the user. In one embodiment, the OID-value pair is included within the identity certificate in a manner such that those devices unfamiliar with certificates with included OID-value pairs are not affected.

According to an aspect of the present application, there is provided a method of handling a request for an identity certificate. The method includes receiving the certification request, the certification request specifying an object and an object identifier associated with the object, responsive to the receiving, generating the identity certificate and amending the identity certificate to include the object and the object identifier to create an amended identity certificate. In other aspects of the present application, a certificate authority is provided for carrying out this method and a computer readable medium is provided for adapting a processor to carry out this method.

Other aspects and features of the present invention will become apparent to those of ordinary skill in the art upon review of the following description of specific embodiments of the invention in conjunction with the accompanying figures.

Referring to FIG. 1, an overview of an example system for use with the embodiments described below is shown. One skilled in the art will appreciate that there may be many different topologies, but the system shown in FIG. 1 helps demonstrate the operation of the systems and methods described in the present application. For example, there may be many user devices connected to the system that are not shown in the overview of FIG. 1.

FIG. 1 shows a user device in the form of a mobile communication device 100. It will be appreciated by those skilled in the art that the mobile communication device 100 may comprise any computing or communication device that is capable of connecting to a network by wireless means, including, but not limited to, personal computers (including tablet and laptop computers), personal digital assistants, smart phones, and the like. It will further be appreciated by those skilled in the art that these devices may be referred to herein as computing devices or communication devices, and may have principal functions directed to data or voice communication over a network, data storage or data processing, or the operation of personal or productivity applications; those skilled in the art will appreciate that terminology such as "mobile device", "communication device", "computing device", or "user device" may be used interchangeably.

The user device 100 may, for example, be connected to an Internet Service Provider on which a user of the system of FIG. 1, likely the user associated with the user device 100 illustrated in FIG. 1, has an account.

The user device 100 may be capable of sending and receiving messages and other data via wireless transmission and reception, as is typically done using electromagnetic waves in the radio frequency (RF) spectrum. The exchange of messages and other data may occur, for instance, between the user device 100 and a base station in a wireless network 106. The user device 100 may receive data by other means, for example through a direct connection to a port provided on the user device 100. An example of such a direct connection is a Universal Serial Bus (USB) link.

As illustrated in FIG. 1, the wireless network 106 connects to a wide area network 114, represented as the Internet, via a wireless infrastructure 110. The wireless infrastructure 110 incorporates a wireless gateway 112 for connecting to the Internet 114.

A connection between the user device 100 and the Internet 114 allows the user device 100 to access a certificate server 116 that is connected to the Internet 114. Also connected to the Internet 114 may be a wireless mail server 118. The certificate server 116 and the wireless mail server 118 may be grouped together in an enterprise 120 and share access to a database 117. Also connected to the Internet 114 may be a certificate authority 130. The user device 100 may store a key pair 124 that includes a private cryptographic key and a corresponding public cryptographic key.

Figure 2:
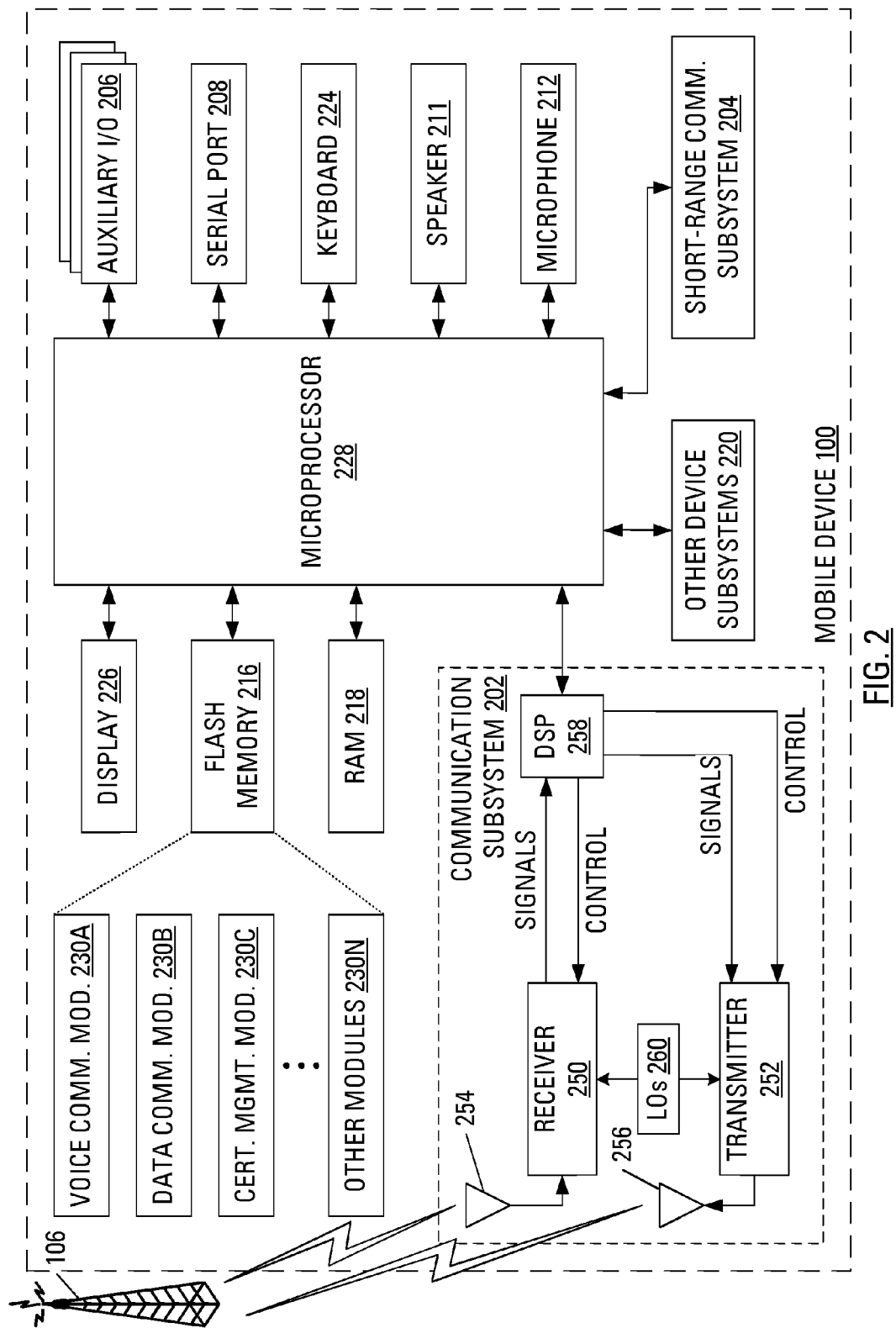
FIG. 2 illustrates a block diagram of a mobile communication device as an example of a device that may carry out a novel method of certificate management as presented herein.

FIG. 2 illustrates the user device 100. The user device 100 includes a housing, an input device (e.g., a keyboard 224 having a plurality of keys) and an output device (e.g., a display 226), which may be a full graphic, or full color, Liquid Crystal Display (LCD). In some embodiments, the display 226 may comprise a touchscreen display. In such embodiments, the keyboard 224 may comprise a virtual keyboard. Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the user device 100, in part, responsive to actuation of the keys on the keyboard 224 by a user. Notably, the keyboard 224 may comprise physical buttons (keys) or, where the display 226 is a touchscreen device, the keyboard 224 may be implemented, at least in part, as "soft keys". Actuation of a so-called soft key involves either touching the display 226 where the soft key is displayed or actuating a physical button in proximity to an indication, on the display 226, of a temporary action associated with the physical button.

The housing may be elongated vertically, or may take on other sizes and shapes (including clamshell housing structures). Where the keyboard 224 includes keys that are associated with at least one alphabetic character and at least one numeric character, the keyboard 224 may include a mode selection key, or other hardware or software, for switching between alphabetic entry and numeric entry.

In addition to the microprocessor 228, other parts of the user device 100 are shown schematically in FIG. 2. These may include a communications subsystem 202, a short-range communications subsystem 204, the keyboard 224 and the display 226. The user device 100 may further include other input/output devices, such as a set of auxiliary I/O devices 206, a serial port 208, a speaker 211 and a microphone 212. The user device 100 may further include memory devices including a flash memory 216 and a Random Access Memory (RAM) 218 and various other device subsystems 220. The user device 100 may comprise a two-way radio frequency (RF) communication device having voice and data communication capabilities. In addition, the user device 100 may have the capability to communicate with other computer systems via the Internet.

Operating system software executed by the microprocessor 228 may be stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the user device 100. A predetermined set of software applications that control basic device operations, such as a voice communications module 230A and a data communications module 230B, may be installed on the user device 100 during manufacture. A certificate management module 230C may also be installed on the user device 100 during manufacture, to implement aspects of the present disclosure. As well, additional software modules, illustrated as an other software module 230N, which may be, for instance, a PIM application, may be installed during manufacture. The PIM application may be capable of organizing and managing data items, such as e-mail messages, calendar events, voice mail messages, appointments and task items. The PIM application may also be capable of sending and receiving data items via a wireless carrier network 270 represented by a radio tower. The data items managed by the PIM application may be seamlessly integrated, synchronized and updated via the wireless carrier network 270 with the device user's corresponding data items stored or associated with a host computer system.

Communication functions, including data and voice communications, are performed through the communication subsystem 202 and, possibly, through the short-range communications subsystem 204. The communication subsystem 202 includes a receiver 250, a transmitter 252 and one or more antennas, illustrated as a receive antenna 254 and a transmit antenna 256. In addition, the communication subsystem 202 also includes a processing module, such as a digital signal processor (DSP) 258, and local oscillators (LOs) 260. The specific design and implementation of the communication subsystem 202 is dependent upon the communication network in which the user device 100 is intended to operate. For example, the communication subsystem 202 of the user device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), etc. Other types of data and voice networks, both separate and integrated, may also be utilized with the user device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM) card, in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the user device 100 may send and receive communication signals over the wireless carrier network 270. Signals received from the wireless carrier network 270 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the wireless carrier network 270 are processed (e.g., modulated and encoded) by the DSP 258 and are then provided to the transmitter 252 for digital to analog conversion, frequency up conversion, filtering, amplification and transmission to the wireless carrier network 270 (or networks) via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as a text message or web page download, is processed by the communication subsystem 202 and is input to the microprocessor 228. The received signal is then further processed by the microprocessor 228 for output to the display 226, or alternatively to some auxiliary I/O devices 206. A device user may also compose data items, such as e-mail messages, using the keyboard 224 and/or some other auxiliary I/O device 206, such as a touchpad, a rocker switch, a thumb-wheel, a trackball, a touchscreen, or some other type of input device. The composed data items may then be transmitted over the wireless carrier network 270 via the communication subsystem 202.

In a voice communication mode, overall operation of the device is substantially similar to the data communication mode, except that received signals are output to the speaker 211, and signals for transmission are generated by a microphone 212. Alternative voice or audio I/O subsystems, such as a voice message recording subsystem, may also be implemented on the user device 100. In addition, the display 226 may also be utilized in voice communication mode, for example, to display the identity of a calling party, the duration of a voice call, or other voice call related information.

The short-range communications subsystem 204 enables communication between the user device 100 and other proximate systems or devices, which need not necessarily be similar devices. For example, the short-range communications subsystem may include an infrared device and associated circuits and components, or a Bluetooth™ communication module to provide for communication with similarly-enabled systems and devices.

In overview, in a certification request, the user device 100 includes an object identifier. When the CA 130 generates an identity certificate responsive to receiving the certification request, the CA 130 includes the object identifier, thereby allowing improved management of the identity certificate at the user device 100 and elsewhere.

To prepare the user device 100 for certificate management, the wireless mail server 118 transmits an information technology (IT) policy to the user device 100. In part, the IT policy includes a CA profile. The CA profile includes a description of a set of information needed by the user device 100 to generate the key pair 124 and compile the information necessary to formulate a certification request for the CA 130. Examples of such information include key lengths, algorithm information, necessary distinguished name information, etc.

An example CA profile has the following structure:
Certificate Authority Profile Name: Test Profile
Certificate Authority Type: MS-Enterprise
Certificate Authority Host: ca.test.domain
Certificate Port: 12345
Key Algorithm: RSA
Key Length: 2048

Figure 3:
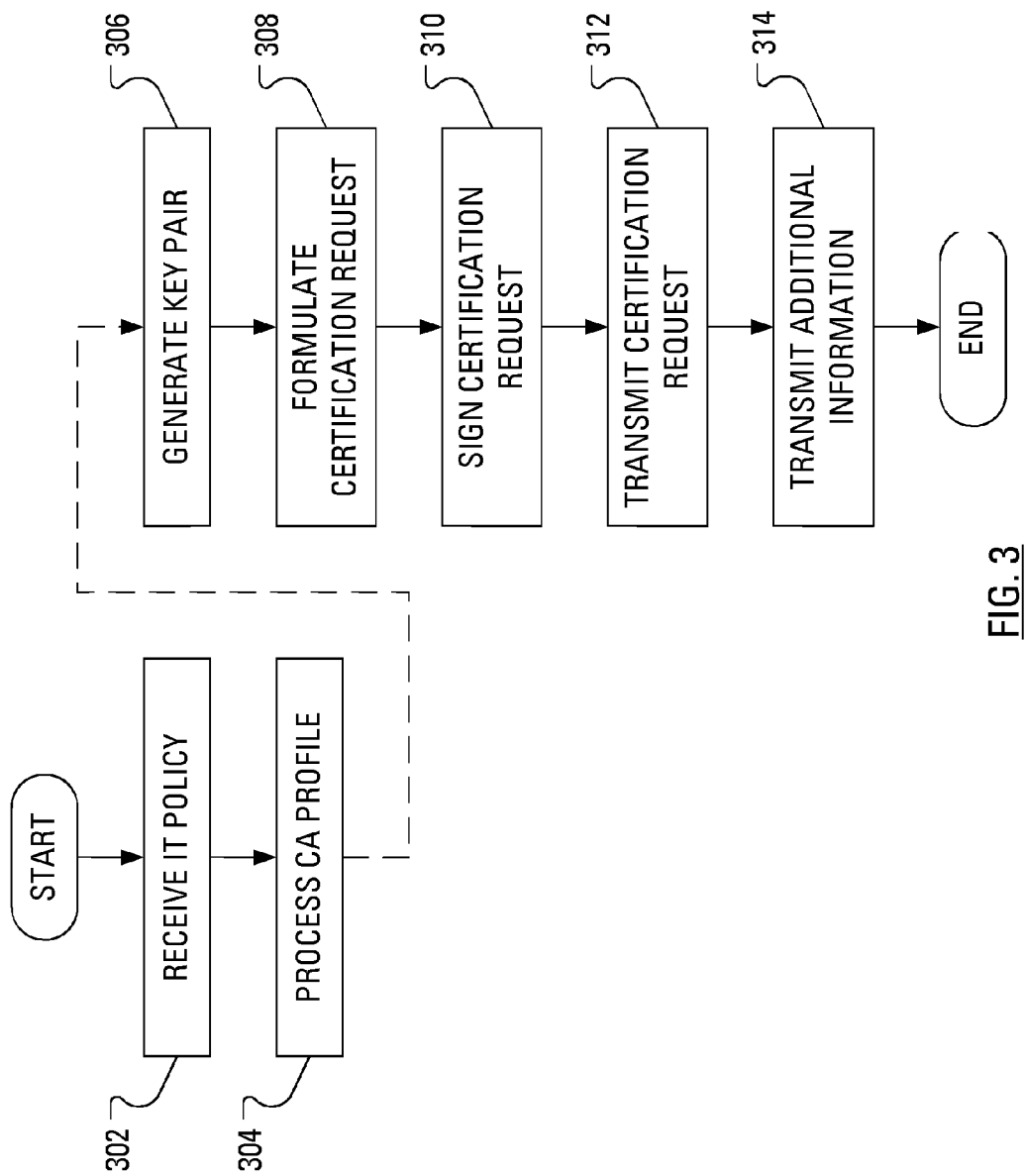
FIG. 3 illustrates example steps in a method of managing, at the user device of FIG. 2, a certification request according to an embodiment.

Example steps in a method of managing, at the user device 100, a certification request are illustrated in FIG. 3. As discussed above, the user device 100 receives (step 302) an IT policy that includes a CA profile that allows the user device 100 to formulate a certification request. Upon receiving the CA profile, the device processes (step 304) the CA profile.

Some time later, the user device 100 may require a cryptographic key pair. Accordingly, the user device 100 generates (step 306) the public-private key pair 124 and collects any other information that, according to the CA profile, needs to be sent as part of the certification request. The user device 100 then formulates (step 308) the certification request.

The certification request may be, for example, a PKCS-10 certification request. "PKCS" refers to a group of Public Key Cryptography Standards devised and published by RSA Security. PKCS-10, in particular, is a Certification Request Standard that defines a format for messages sent to a certification authority to request certification of a public key. The PKCS-10 standard is specified in Request For Comments (RFC) 2986 published by the Internet Engineering Task Force (IETF) at www.ietf.org.

As provided for by embodiments of the present disclosure, the user device 100 includes, in the PKCS-10 request, a request to have an additional "non-critical certificate extension" added to the identity certificate that is issued by the CA 130. The "non-critical certificate extension" is non-critical in the sense that clients without the capability to process the extension will just ignore it. According to embodiments of the present disclosure, the "non-critical certificate extension" may be an OID-value pair, where the OID represents that the certification request is a certification request that has been formulated according to a specific CA profile.

After formulating the certification request, the user device 100 signs (step 310) the certification request. Such signing of the certification request may involve generating a hash of the certification request and encrypting the hash of the certification request using the private key half of the key pair 124. The encrypted hash of the certification request may then be transmitted along with the certification request as a signature. Once the certification request has been signed, the user device 100 transmits (step 312) the certification request and the signature to the certificate server 116.

In addition to transmitting (step 312) the signed certification request, the user device 100 also transmits (step 314) additional information about the public key for which the certification request has been generated. In particular, the user device 100 may transmit (step 314), to the certificate server 116, other properties of the CA profile used when formulating the certification request. The additional information allows the certificate server 116 to retrieve information necessary to verify that the formulated certification request contains all the necessary information.

Figure 4:
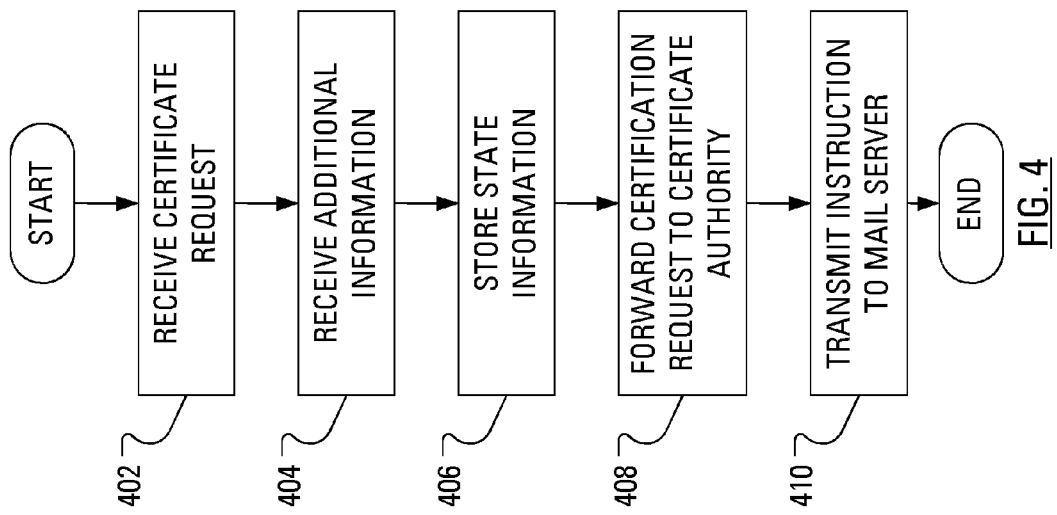
FIG. 4 illustrates example steps in a method of handling, at the certificate server of FIG. 1, a certification request from the user device according to an embodiment.

Example steps in a method of handling, at the certificate server 116, the certification request from the user device 100 are illustrated in FIG. 4. Initially, the certificate server 116 may receive (step 402) the certification request from the user device 100. Additionally, the certificate server 116 may receive (step 404) the additional information from the user device 100. Responsive to receiving (steps 402, 404) the certification request and the additional information from the user device 100, the certificate server 116 may store (step 406) some state data about the certification request locally. For instance, the certificate server 116 may record the additional information received in conjunction with the certification request.

In one embodiment, the additional information may comprise an ID for the CA profile. Since the certificate server 116 needs to know where to forward a certification request to, the certificate server 116 can look up the required information based on the CA profile ID. Using the example CA profile, the certificate server 116 would forward the certification request to the Certificate Authority Host, ca.test.domain, that is listening on port 12345.

Additionally, the certificate server 116 forwards (step 408) the certification request to the CA 130. Subsequently, the certificate server 116 may transmit (step 410) an instruction to the wireless mail server 118 to activate identity certificate handling. Such an instruction may include an indication of the OID received in conjunction with the certification request.

Figure 5:
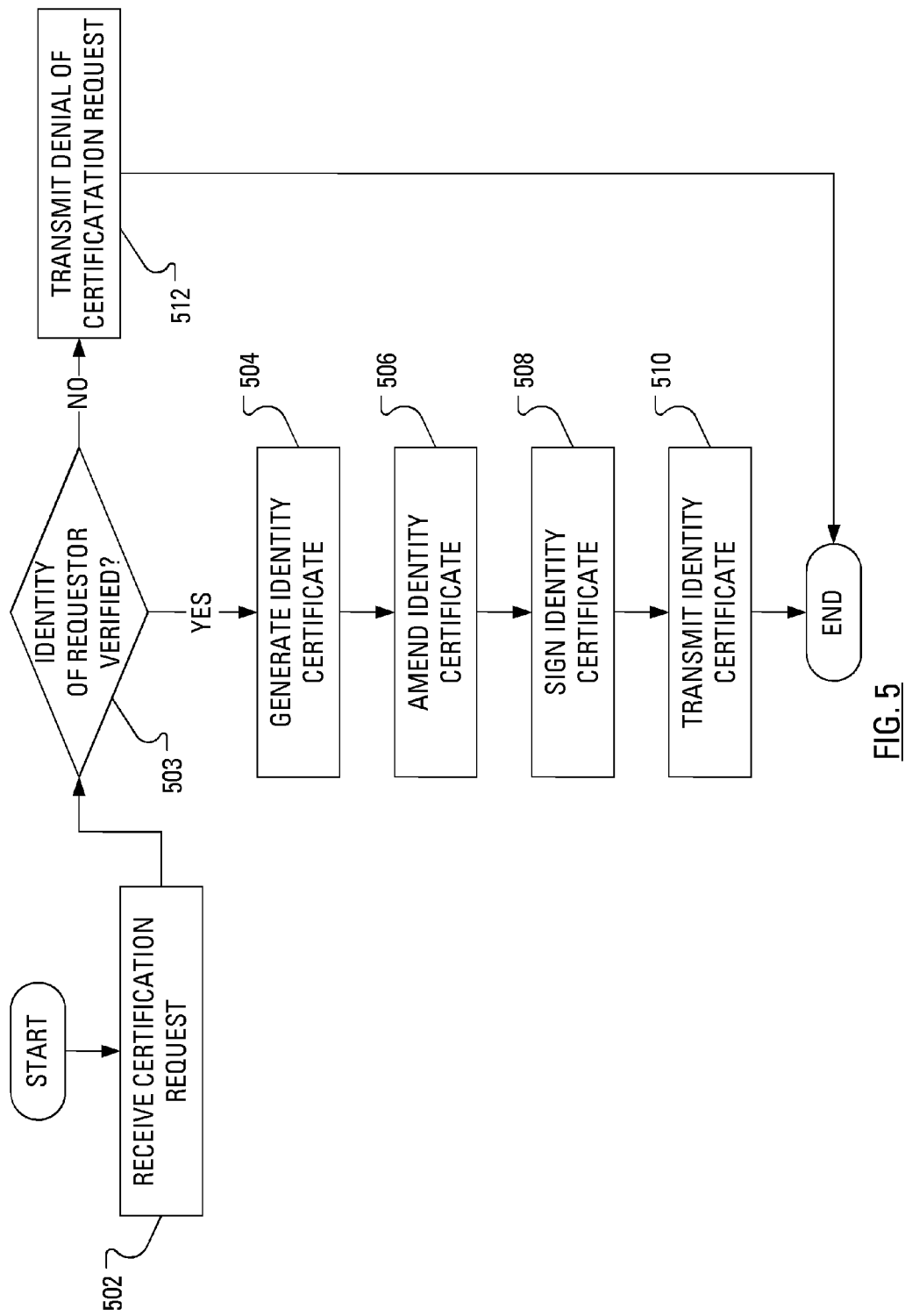
FIG. 5 illustrates example steps in a method of handling, at the certificate authority of FIG. 1, a certification request from the certificate server of FIG. 1 according to an embodiment.

Example steps in a method of handling, at the CA 130, the certification request from the certificate server 116 are illustrated in FIG. 5.

Upon receiving (step 502) the certification request from the certificate server 116, the CA 130 may carry out an identity verification process (step 503) to ensure that the certification request came from the user device 100, as indicated in the certification request. As mentioned, the user device 100 signs (step 310, FIG. 3) the certification request with its private key. Accordingly, the identity verification process carried out by the CA 130 may involve authenticating the signature transmitted with the certification request through use of the public key associated with the user device 100.

Upon successfully verifying the identity of the user device 100, the CA 130 generates (step 504) an identity certificate. The CA 130 may, for instance, generate the identity certificate according to a standard published by the Telecommunication Standardization Sector of the International Telecommunication Union. The sector is known as ITU-T and the standard is known as X.509. Along with the format for identity certificates, the X.509 standard covers standard formats for certificate revocation lists, attribute certificates, and a certification path validation algorithm. As discussed above, the certification request includes a request to have an OID-value pair added, as a "non-critical certificate extension", to the identity certificate. Accordingly, after generation (step 504) of the identity certificate, the CA 130 amends (step 506) the identity certificate to include the requested OID-value pair. Once the identity certificate has been generated and amended, the CA 130 signs (step 508) the identity certificate with its private key and transmits (step 510) the signed identity certificate as an attachment to an e-mail message addressed to the user device 100.

Upon failure to verify the identity of the user device 100, the CA 130 may transmit (step 512) a denial of the certification request to the user device 100.

Example steps in a method of handling, at the wireless mail server 118, the identity certificate from the CA 130 are illustrated in FIG. 6. The wireless mail server 118 routinely receives e-mail messages that are to be forwarded to the user device 100 and to other devices.

Upon receiving (step 602) an instruction from the certificate server 116, wireless mail server 118 may depart from routine message handling and activate (step 604) identity certificate handling, wherein the wireless mail server 118 receives (step 606) an incoming e-mail message and inspects incoming e-mail message to determine (step 608) whether the incoming e-mail message has an identity certificate attached. Such determining may be accomplished by inspecting the header of the e-mail message. More particularly, the wireless mail server 118 may inspect the header for an indication that an attachment has the X.509-specified identity certificate format.

Responsive to determining (step 608) that the incoming e-mail message does not have an identity certificate attached, the wireless mail server 118 may simply forward (step 614) the e-mail message to the user device 100.

Responsive to determining (step 604) that the incoming e-mail message does have an identity certificate attached, the wireless mail server 118 may extract (step 610) the identity certificate from the e-mail message.

As part of extracting (step 610) the identity certificate from the e-mail message, the wireless mail server 118 may inspect the extracted identity certificate to determine whether the identity certificate includes an OID. In the event that the wireless mail server 118 determines that the identity certificate includes an OID, the wireless mail server 118 may determine whether the included OID matches the OID specified by the certificate server 116 in the instruction to activate identity certificate handling. Alternatively, other information may be used to verify that the identity certificate issued actually corresponds to the certification request initially sent by the user device 100. The other information may be used in conjunction with the OID or independently of the OID. Such other information may include, for example, the public key contained in the identity certificate.

Upon determining that the OID included in the extracted identity certificate matches the OID specified by the certificate server 116 in the instruction to activate identity certificate handling, the wireless mail server 118 transmits (step 612) the identity certificate to the user device 100. Such transmission (step 612) of the identity certificate to the user device 100 may be accomplished over a configuration channel between the wireless mail server 118 and the user device 100.

The wireless mail server 118 may then forward (step 614) the e-mail message to the user device 100. However, such forwarding may be considered unnecessary given that the identity certificate has already been transmitted. Accordingly, the wireless mail server 118 may refrain from forwarding the e-mail message to the user device 100.

The user device 100, upon receiving the identity certificate, may store the identity certificate in association with the key pair 124, the public key portion of which was included in the formulation (step 308, FIG. 3) of the certification request. As noted in conjunction with the description of FIG. 5, above, the CA 130 signs the identity certificate. To confirm that received identity certificate was generated by the CA 130, the user device 100 may process the signature included with the identity certificate. Such processing may involve the use of the public key of the CA 130. One manner in which the user device 100 may come to have the public key of the CA 130 is through the processing (step 304) of the CA profile provided.

The public key of the CA 130 is available to the user device 100 after the corresponding identity certificate for the CA 130 has been imported into the key store of the user device 100. Such importing may be accomplished via a connection to a computer that has identity certificate for the CA 130. The connection may be physical or wireless. In one embodiment, the identity certificate for the CA 130 is provided wirelessly by the combination of the wireless mail server 118 and certificate server 116.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method comprising:
receiving, subsequent to receiving a first object identifier, a message specifying a destination device;
determining that the message includes an identity certificate;
determining that the identity certificate includes a second object identifier that matches the first object identifier;
responsive to the determination that the second object identifier matches the first object identifier, extracting the identity certificate from the message; and
transmitting the identity certificate to the destination device for automatic storage at the device.

2. The method of claim 1 wherein the determining that the message includes an identity certificate comprises inspecting a header of the message for an indication of a presence of an attachment.

3. The method of claim 2 wherein the inspecting the header comprises locating an indication that the attachment has an ITU-T X.509 standard format.

4. The method of claim 1 wherein the transmitting the identity certificate to the destination device employs a configuration channel.

5. The method of claim 1 wherein said first object identifier is received along with an instruction to activate identity certificate handling.

6. A wireless mail server adapted to:
receive, subsequent to receiving a first object identifier, a message specifying a destination device;
determine that the message includes an identity certificate;
determine that the identity certificate includes a second object identifier;
determine that the second object identifier matches the first object identifier;
extract the identity certificate from the message; and
transmit the identity certificate to the destination device for automatic storage at the device.

7. The wireless mail server of claim 6 further adapted to inspect a header of the message for an indication of a presence of an attachment to determine that the message includes an identity certificate.

8. The wireless mail server of claim 7 further adapted to locate an indication that the attachment has an ITU-T X.509 standard format.

9. The wireless mail server of claim 6 further adapted to employ a configuration channel for the transmitting the identity certificate to the destination device.

10. A non-transitory computer readable medium containing computer-executable instructions that, when performed by a processor, cause the processor to:
receive, subsequent to receiving a first object identifier, a message specifying a destination device;
determine that the message includes an identity certificate;
determine that the identity certificate includes a second object identifier;
determine that the second object identifier matches the first object identifier;
extract the identity certificate from the message; and
transmit the identity certificate to the destination device for automatic storage at the device.

11. The non-transitory computer readable medium of claim 10 wherein the instructions further cause the processor to inspect a header of the message for an indication of a presence of an attachment to determine that the message includes an identity certificate.

12. The non-transitory computer readable medium of claim 11 wherein the instructions further cause the processor to locate an indication that the attachment has an ITU-T X.509 standard format.

13. The non-transitory computer readable medium of claim 10 wherein the instructions further cause the processor to employ a configuration channel for the transmitting the identity certificate to the destination device.

* * * * *